(12) United States Patent
Guarnieri et al.

(10) Patent No.: US 8,526,049 B2
(45) Date of Patent: Sep. 3, 2013

(54) SYSTEMS AND METHODS FOR DISPLAY LIST MANAGEMENT

(75) Inventors: Stuart Guarnieri, Laramie, WY (US); Tim Prebble, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1846 days.

(21) Appl. No.: 11/394,783

(22) Filed: Mar. 31, 2006

(65) Prior Publication Data
US 2007/0236733 A1 Oct. 11, 2007

(51) Int. Cl.
*G06K 15/00* (2006.01)
(52) U.S. Cl.
USPC .......................................... 358/1.16
(58) Field of Classification Search
USPC .......................................... 358/1.16
See application file for complete search history.

(56) References Cited

U.S. PATENT DOCUMENTS

| | | | |
|---|---|---|---|
| 5,010,515 A | 4/1991 | Torborg et al. | |
| 5,319,778 A * | 6/1994 | Catino | 707/102 |
| 5,471,579 A | 11/1995 | Kimura et al. | |
| 5,479,587 A | 12/1995 | Campbell et al. | |
| 5,491,808 A * | 2/1996 | Geist, Jr. | 711/100 |
| 5,502,462 A | 3/1996 | Mical et al. | |
| 5,577,243 A | 11/1996 | Sherwood et al. | |
| 5,778,414 A * | 7/1998 | Winter et al. | 711/5 |
| 5,793,937 A * | 8/1998 | Chura et al. | 358/1.16 |
| 5,864,342 A | 1/1999 | Kajiya et al. | |
| 5,913,018 A * | 6/1999 | Sela | 358/1.17 |
| 5,959,867 A | 9/1999 | Speciner et al. | |
| 5,978,893 A | 11/1999 | Bakshi et al. | |
| 5,999,709 A | 12/1999 | Fiala et al. | |
| 6,031,995 A * | 2/2000 | George | 717/166 |
| 6,040,917 A | 3/2000 | Campbell et al. | |
| 6,057,847 A | 5/2000 | Jenkins | |
| 6,111,582 A | 8/2000 | Jenkins | |
| 6,192,157 B1 | 2/2001 | Prebble | |

(Continued)

FOREIGN PATENT DOCUMENTS

| | | |
|---|---|---|
| JP | 2-275525 | 11/1990 |
| JP | 2005-73004 | 3/2005 |
| JP | 2005-190487 | 7/2005 |
| JP | 2009-245437 | 10/2009 |

OTHER PUBLICATIONS

U.S. Appl. No. 11/515,337, filed Aug. 31, 2006.
U.S. Appl. No. 12/059,627, filed Mar. 31, 2008.
U.S. Appl. No. 12/059,692, filed Mar. 31, 2008.
Office Action dated Oct. 7, 2010, in related U.S. Appl. No. 12/059,692, filed Mar. 31, 2008.
Office Action dated Mar. 21, 2011, in U.S. Appl. No. 11/515,337, filed Aug. 31, 2006.

(Continued)

*Primary Examiner* — Jeremiah Bryar
(74) *Attorney, Agent, or Firm* — Finnegan, Henderson, Farabow, Garrett & Dunner, L.L.P.

(57) ABSTRACT

Systems and methods consistent with some embodiments of the present invention provide data structures and methods for the automatic storing, manipulating and processing of a intermediate printable data generated from a first printable data are presented. In some embodiments, the first printable data may take the form of a PDL description of a document and the intermediate printable data may take the form of a display list of objects generated from the PDL description.

In some embodiments, a data structure for storing a intermediate printable data generated from a first printable data may comprise at least one memory pool, which may further comprise a plurality of uniformly sized segments to store the intermediate printable data; at least one global structure for storing information related to the one or more memory pools; and buffers for performing operations on the first printable data and the intermediate printable data.

23 Claims, 6 Drawing Sheets

(56) References Cited

U.S. PATENT DOCUMENTS

| | | | |
|---|---|---|---|
| 6,249,793 B1 | 6/2001 | Printezis et al. | |
| 6,326,964 B1 | 12/2001 | Snyder et al. | |
| 6,366,289 B1 | 4/2002 | Johns | |
| 6,490,670 B1 | 12/2002 | Collins et al. | |
| 6,643,759 B2* | 11/2003 | Andersson et al. | 714/207 |
| 6,701,420 B1 | 3/2004 | Hamilton et al. | |
| 6,778,292 B1* | 8/2004 | Someno | 358/1.16 |
| 6,809,730 B2 | 10/2004 | Howson | |
| 6,860,203 B2 | 3/2005 | Danilo et al. | |
| 7,113,302 B2 | 9/2006 | Reddy et al. | |
| 7,196,710 B1 | 3/2007 | Fouladi et al. | |
| 7,447,836 B2 | 11/2008 | Zhang et al. | |
| 7,697,168 B2 | 4/2010 | Ozawa et al. | |
| 7,715,031 B2 | 5/2010 | Westervelt et al. | |
| 8,045,215 B2 | 10/2011 | Jacobsen et al. | |
| 8,228,555 B2 | 7/2012 | Prebble | |
| 2001/0015820 A1 | 8/2001 | Conrad et al. | |
| 2001/0055129 A1* | 12/2001 | Shimizu | 358/520 |
| 2002/0063894 A1* | 5/2002 | Campbell et al. | 358/1.16 |
| 2002/0078298 A1 | 6/2002 | Jeddeloh | |
| 2002/0093669 A1* | 7/2002 | Campbell et al. | 358/1.9 |
| 2002/0097433 A1* | 7/2002 | Chang et al. | 358/1.15 |
| 2002/0120826 A1* | 8/2002 | Venkatraman et al. | 711/207 |
| 2004/0044873 A1* | 3/2004 | Wong et al. | 711/218 |
| 2004/0120007 A1 | 6/2004 | Jacobsen et al. | |
| 2004/0193775 A1* | 9/2004 | Van Doren et al. | 711/1 |
| 2004/0207861 A1* | 10/2004 | Hattori | 358/1.7 |
| 2004/0233207 A1 | 11/2004 | Morphet | |
| 2005/0044549 A1* | 2/2005 | Morikawa et al. | 718/102 |
| 2005/0067498 A1 | 3/2005 | Smith | |
| 2006/0069898 A1 | 3/2006 | Patel et al. | |
| 2007/0146785 A1 | 6/2007 | Akiyama et al. | |
| 2007/0229900 A1 | 10/2007 | Guarnieri et al. | |
| 2008/0162863 A1 | 7/2008 | McClure et al. | |
| 2009/0086254 A1 | 4/2009 | Duong | |
| 2009/0172336 A1 | 7/2009 | Schmidt | |
| 2009/0244593 A1 | 10/2009 | Prebble | |
| 2009/0249017 A1 | 10/2009 | Prebble | |
| 2010/0053179 A1 | 3/2010 | Bellert | |
| 2010/0060934 A1 | 3/2010 | Bellert | |
| 2010/0079809 A1 | 4/2010 | Bellert | |

OTHER PUBLICATIONS

Office Action dated Apr. 6, 2011, in U.S. Appl. No. 12/059,692, filed Mar. 31, 2008.
Office Action dated Apr. 27, 2011, in U.S. Appl. No. 12/201,735, filed Aug. 29, 2008.
Office Action dated Jul. 1, 2011, in U.S. Appl. No. 12/242,668, filed Sep. 30, 2008.
Office Action dated Sep. 12, 2011, in U.S. Appl. No. 11/515,337, filed Aug. 31, 2006.
Office Action dated Jan. 5, 2012, in U.S. Appl. No. 11/515,337, filed Aug. 31, 2006.
Office Action dated Sep. 7, 2012, in U.S. Appl. No. 11/515,337, filed Aug. 31, 2006.
Office Action dated Nov. 23, 2011, in U.S. Appl. No. 12/059,627, filed Mar. 31, 2008.
Notice of Allowance dated Mar. 23, 2012, in U.S. Appl. No. 12/059,627, filed Mar. 31, 2008.
Office Action dated Dec. 11, 2012, in U.S. Appl. No. 12/059,692, filed Mar. 31, 2008.
Office Action dated Sep. 30, 2011, in U.S. Appl. No. 12/201,735, filed Aug. 29, 2008.
Office Action dated Jul. 2, 2012, in U.S. Appl. No. 12/201,735, filed Aug. 29, 2008.
Office Action dated Feb. 26, 2013, in U.S. Appl. No. 12/201,735, filed Aug. 29, 2008.
Office Action dated Dec. 15, 2011, in U.S. Appl. No. 12/209,046, filed Sep. 11, 2008.
Office Action dated Jun. 11, 2012, in U.S. Appl. No. 12/209,046, filed Sep. 11, 2008.
Office Action dated Feb. 9, 2012, in U.S. Appl. No. 12/242,668, filed Sep. 30, 2008.
Office Action dated Aug. 17, 2012, in U.S. Appl. No. 12/242,668, filed Sep. 30, 2008.
Office Action dated Dec. 10, 2012, in U.S. Appl. No. 12/242,668, filed Sep. 30, 2008.
Notification of Reasons for Refusal mailed by the Japanese Patent Office on Feb. 19, 2013, in Japanese patent application No. 2009-081519.

* cited by examiner

SYSTEMS AND METHODS FOR DISPLAY LIST MANAGEMENT

BACKGROUND

1. Field of the Invention

The present invention relates to the field of printing and in particular, to systems and methods to manage display lists.

2. Description of Related Art

Document processing software allows users to view, edit, process, and store documents conveniently. Pages in a document may be displayed on screen exactly as they would appear in print. However, before the document can be printed, pages in the document are often described in a page description language ("PDL"). As used in this application PDL's may include PostScript, Adobe PDF, HP PCL, Microsoft XPS, and variants thereof as well as any other languages used to describe pages in a document. A PDL description of a document provides a high-level description of each page in a document. This PDL description is often translated to a series of lower-level printer-specific commands when the document is being printed.

The translation process from PDL to lower-level printer-specific commands may be complex and depend on the features and capabilities offered by a particular printer. A printer manufacturer will often make several trade-offs in order to optimize printer performance based on available memory, desired print speed, and other cost and performance issues. For example, a manufacturer may choose to limit the maximum resolution of a printer with limited memory in order to improve the throughput of the printer. Because the eventual trade-offs are model specific, the introduction of new printers or upgrades to existing printers often require revisiting the optimization decisions and may even result in a major overhaul of translation algorithms. Consequently, the introduction of new printer models, or upgrades to existing printers, may be more expensive, sub-optimal, and needlessly delayed. Moreover, the optimal use of printer resources allows a more complete exploitation of available printer capability and leads to good performance. Thus, there is a need for flexible and portable general-purpose schemes to translate PDL descriptions of documents to printer-specific commands.

SUMMARY

In accordance with the present invention, systems and methods for the automatic storing, manipulating, and processing of a second or intermediate form of printable data generated from a first printable data are presented. In some embodiments, the first printable data may take the form of a PDL description of a document and the intermediate printable data may take the form of a display list of objects generated from the PDL description.

In some embodiments, a computer memory comprising a data structure for storing an intermediate printable data generated from a first printable data may comprise at least one memory pool, which may further comprise a plurality of uniformly sized segments to store the intermediate printable data; at least one global structure for storing information related to the one or more memory pools; and buffers for performing operations on the first printable data and the intermediate printable data. In some embodiments, the uniformly sized segments may occupy contiguous memory locations. In some embodiments, the uniformly sized segments may have a predetermined size. In some embodiments, uniformly sized segments may comprise of either control data structures, or a block to store objects present in the intermediate printable data.

In some embodiments, the control data structure may comprise one or more of virtual pages, bands, and nodes. In some embodiments, the vpage data structure may comprise a linked list of geometric band data structures representing geometric bands associated with the virtual page, wherein the geometric band data structure may further comprise a linked list of node data structures, wherein the node data structure may include references to any associated blocks. In some embodiments, the data managed by the geometric band may contain offsets to objects stored in a reference band. In some embodiments, the reference band may be configured to hold to data or graphical objects. In some embodiments, the data or graphical objects span geometric band boundaries. In some embodiments, the data or graphical objects may be repeatedly used. In some embodiments, the vpage data structure may include offsets to a compression band. In some embodiments, the compression band may be configured to hold compressed data or compressed graphical objects.

In some embodiments, the objects in the bands, nodes, and blocks may be individually accessed, edited, and processed. Processing of the objects may include one or more of the operations of compression, decompression, and pre-rasterization. In some embodiments, each block may hold one or more of a data object, a graphical object, and/or offsets to data or graphical objects. In some embodiments, each block may be uniformly-sized, and equal in size to the uniformly-sized segments.

In some embodiments, the global structure pertaining to the at least one memory pool may include fields for one or more of offsets to the start of the at least one memory pool; mechanisms to regulate access to the at least one memory pool; offsets to the start of the buffers; and lists of vpages, bands, nodes, and blocks. In some embodiments, the buffers may include one or more of compression buffers, decompression buffers, and compaction buffers. In some embodiments, the memory pool may include a base memory pool, which may be allocated at boot time and may also include additional dynamically allocated memory pools.

Embodiments of the present invention also relate to data structures created, stored, accessed, or modified by processors using computer-readable media or computer-readable memory.

These and other embodiments are further explained below with respect to the following figures.

DETAILED DESCRIPTION

In accordance with embodiments reflecting various features of the present invention, systems and methods for the automatic storing, manipulating, and processing of a second or intermediate form of printable data generated from a first printable data are presented. In some embodiments, the first printable data may take the form of a PDL description of a document and the intermediate printable data may take the form of a display list of objects generated from the PDL description.

Figure 1:
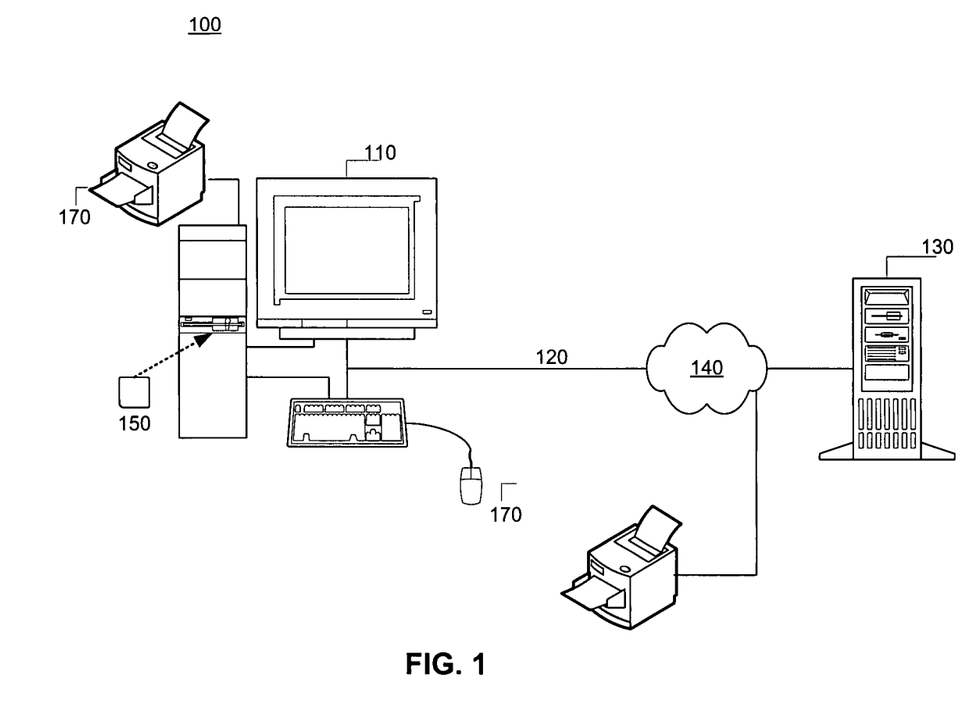
FIG. 1 shows a block diagram illustrating components in a system for printing documents according to some embodiments of the present invention.

FIG. 1 shows a block diagram illustrating components in a system for printing documents according to some embodiments of the present invention. A computer software application consistent with the present invention may be deployed on a network of computers, as shown in FIG. 1, that are connected through communication links that allow information to be exchanged using conventional communication protocols and/or data port interfaces.

As shown in FIG. 1, exemplary system 100 includes computers including a computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Exemplary printer 170 includes devices that produce physical documents from electronic data including, but not limited to, laser printers, ink-jet printers, LED printers, plotters, facsimile machines, and digital copiers. In some embodiments, printer 170 may also be capable of directly printing documents received from computing device 110 or server 130 over connection 120. In some embodiments such an arrangement may allow for the direct printing of documents, with (or without) additional processing by computing device 110 or server 130. In some embodiments, documents may contain one or more of text, graphics, and images. In some embodiments, printer 170 may receive PDL descriptions of documents for printing. Note, too, that document print processing can be distributed. Thus, computing device 110, server 130, and/or the printer may perform portions of document print processing such as half-toning, color matching, and/or other manipulation processes before a document is physically printed by printer 170.

Computing device 110 also contains removable media drive 150. Removable media drive 150 may include, for example, 3.5 inch floppy drives, CD-ROM drives, DVD ROM drives, CD±RW or DVD±RW drives, USB flash drives, and/or any other removable media drives consistent with embodiments of the present invention. In some embodiments, portions of the software application may reside on removable media and be read and executed by computing device 110 using removable media drive 150.

Connection 120 couples computing device 110, server 130, and printer 170 and may be implemented as a wired or wireless connection using conventional communication protocols and/or data port interfaces. In general, connections 120 can be any communication channel that allows transmission of data between the devices. In one embodiment, for example, the devices may be provided with conventional data ports, such as parallel ports, serial ports, Ethernet, USB, SCSI, FIREWIRE, and/or coaxial cable ports for transmission of data through the appropriate connection. In some embodiments, connection 120 may be a Digital Subscriber Line (DSL), an Asymmetric Digital Subscriber Line (ADSL), or a cable connection. The communication links could be wireless links or wired links or any combination consistent with embodiments of the present invention that allows communication between the various devices.

Network 140 could include a Local Area Network (LAN), a Wide Area Network (WAN), or the Internet. In some embodiments, information sent over network 140 may be encrypted to ensure the security of the data being transmitted. Printer 170 may be connected to network 140 through connection 120. In some embodiments, printer 170 may also be connected directly to computing device 110 and/or server 130. System 100 may also include other peripheral devices (not shown), according to some embodiments of the present invention. A computer software application consistent with the present invention may be deployed on any of the exemplary computers, as shown in FIG. 1. For example, computing device 110 could execute software that may be downloaded directly from server 130. Portions of the application may also be executed by printer 170 in accordance with some embodiments of the present invention.

Figure 2:
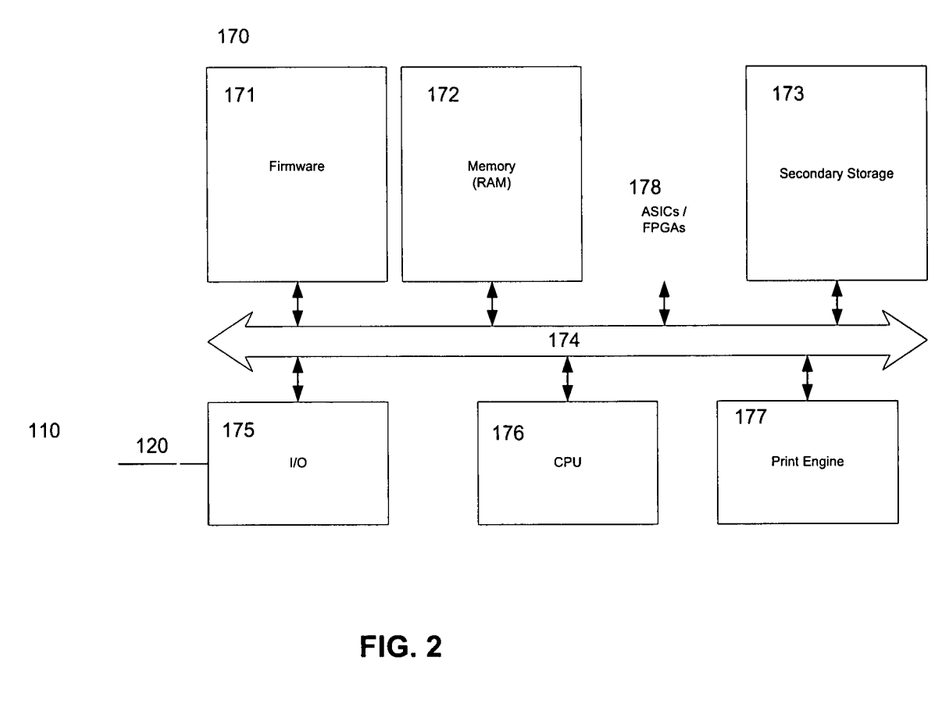
FIG. 2 shows a high level block diagram of an exemplary printer.

FIG. 2 shows a high-level block diagram of exemplary printer 170. In some embodiments, printer 170 may contain bus 174 that couples CPU 176, firmware 171, memory 172, input-output ports 175, print engine 177, and secondary storage device 173. Printer 170 may also contain other Application Specific Integrated Circuits (ASICs), and/or Field Programmable Gate Arrays (FPGAs) 178 that are capable of executing portions of an application to print documents according to some embodiments of the present invention. In some embodiments, printer 170 may also be able to access secondary storage or other memory in computing device 110 using I/O ports 175 and connection 120. In some embodiments, printer 170 may also be capable of executing software including a printer operating system and other appropriate application software. In some embodiments, printer 170 may allow paper sizes, output trays, color selections, and print resolution, among other options, to be user-configurable.

In some embodiments, CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, pre-defined routines, and other code. In some embodiments, code and data in firmware 171 may be copied to memory 172 prior to being acted upon by CPU 176. Routines in firmware 171 may include code to translate page descriptions received from computing device 110 to display lists and image bands. In some embodiments, firmware 171 may include rasterization routines to convert display commands in a display list to an appropriate rasterized bit map and store the bit map in memory 172. Firmware 171 may also include compression routines and memory management routines. In some embodiments, data and instructions in firmware 171 may be upgradeable.

In some embodiments, CPU 176 may act upon instructions and data and provide control and data to ASICs/FPGAs 178 and print engine 177 to generate printed documents. In some embodiments, ASICs/FPGAs 178 may also provide control and data to print engine 177. FPGAs/ASICs 178 may also implement one or more of translation, compression, and rasterization algorithms. In some embodiments, computing device 110 can transform document data into a first printable data. Then, the first printable data can be sent to printer 170 for transformation into intermediate printable data. Printer 170 may transform intermediate printable data into a final form of printable data and print according to this final form. In some embodiments, the first printable data may correspond to a PDL description of a document. In some embodiments, the translation process from a PDL description of a document to the final printable data comprising of a series of lower-level printer-specific commands may include the generation intermediate printable data comprising of display lists of objects. In some embodiments, display lists may hold one or more of text, graphics, and image data objects. In some embodiments, objects in display lists may correspond to similar objects in a user document. In some embodiments, display lists may aid in the generation of intermediate printable data. In some embodiments, display lists may be stored in memory 172 or secondary storage 173. Exemplary secondary storage 173 may be an internal or external hard disk, memory stick, or any other memory storage device capable of being used system 200. In some embodiments, the display list may reside one or more of printer 170, computing device 110, and server 130. Memory to store display lists may be a dedicated memory or form part of general purpose memory, or some combination thereof according to some embodiments of the present invention. In some embodiments, memory may be dynamically allocated to hold display lists as needed. In some embodiments, memory allocated to store display lists may be dynamically released after processing.

Figure 3:
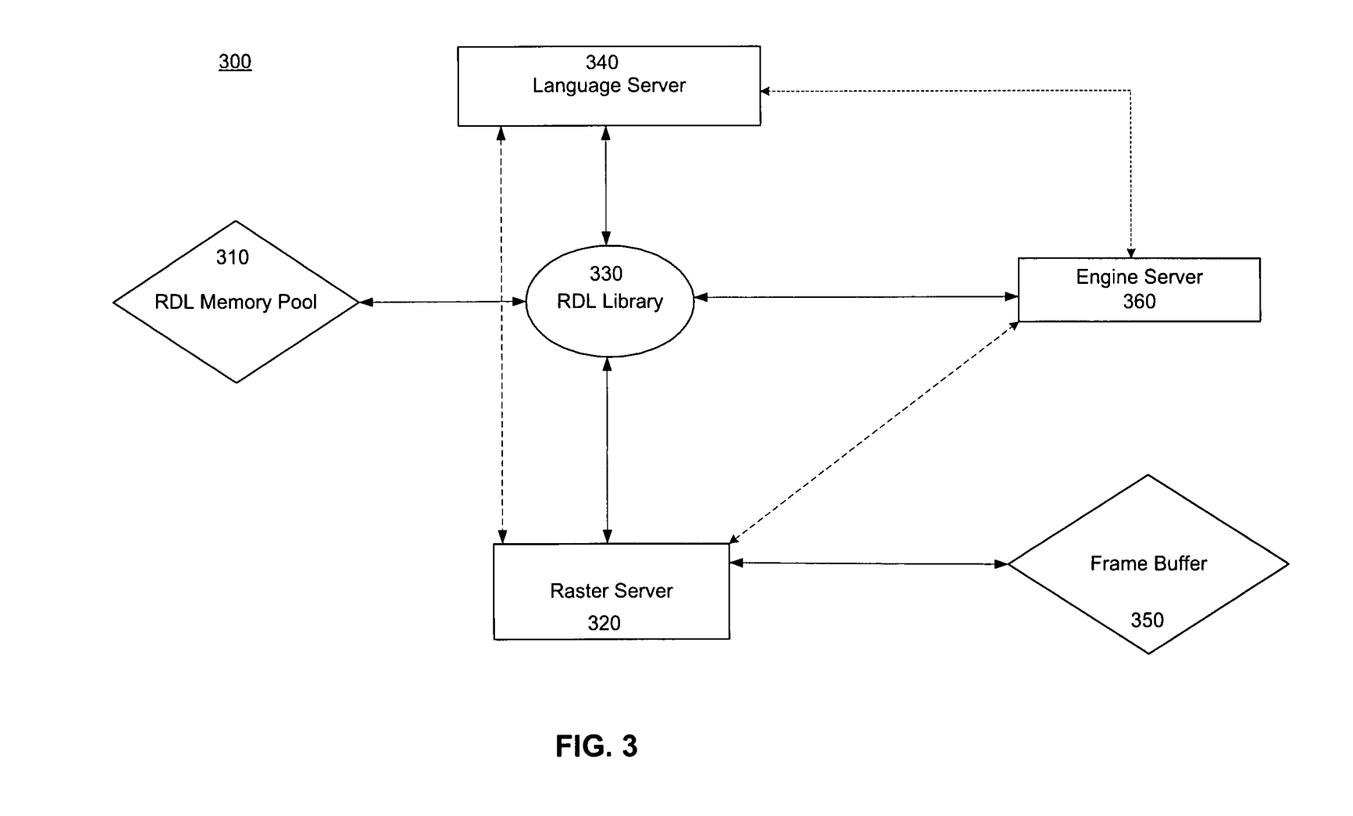
FIG. 3 shows an exemplary high-level architecture of a system for flexible display lists according to some embodiments of the present invention.

FIG. 3 shows an exemplary high-level architecture of a system for creating and managing display lists flexibly according to some embodiments of the present invention. As shown in FIG. 3, language server 340, engine server 360, and raster server 320 may communicate with each other. In addition, language server 340, engine server 360, and raster server 320 may invoke routines and communicate with RDL library 330. In some embodiments, the display list may include commands defining data objects and their contexts within a document or a page within the document to be printed. These display commands may include data comprising characters or text, line drawings or vectors, and images or raster data. In some embodiments, the display list may be dynamically reconfigurable and is termed a Reconfigurable Display List ("RDL").

In some embodiments the translation of a PDL description of a document into a display list representation may be performed by language server 340 using routines in RDL library 330. In some embodiments, language server 340 may take PDL language primitives and transform these into data and graphical objects and add these to the display list using the capability provided by RDL library 330. In some embodiments, access to functions and routines in RDL library 330 may be provided through an Application Programming Interface ("API"). In some embodiments, the display list may be stored and manipulated in a dynamically allocated memory pool such as exemplary RDL memory pool 320. In some embodiments, the display list may be a second or intermediate step in the processing of data prior to actual printing and may be parsed before conversion into a subsequent form. In some embodiments the subsequent form may be a final representation, and the conversion process may be referred to as rasterizing the data. In some embodiments rasterization may be performed by raster server 320. Upon rasterization, the rasterized data may be stored in frame buffer 350, which may be part of memory 172. Print engine 177, may process the rasterized data in frame buffer 350, and form a printable image of the page on a print medium, such as paper. In some embodiments, raster server 320 and engine server 360 may also use routines in RDL library 330 to perform their functions. In some embodiments, engine server 360 may provide control information, instructions, and data to print engine 177. In some embodiments, engine server 360 may free memory used by display list objects after processing for return to RDL memory pool 320. In some embodiments, portions of RDL memory pool and/or frame buffer 350 may reside in memory 172 or secondary storage 173. In some embodiments, routines for language server 340, raster server 320, and engine server 360 may be provided in firmware 171 or may be implemented using ASICs/FPGAs 178.

Figure 4:
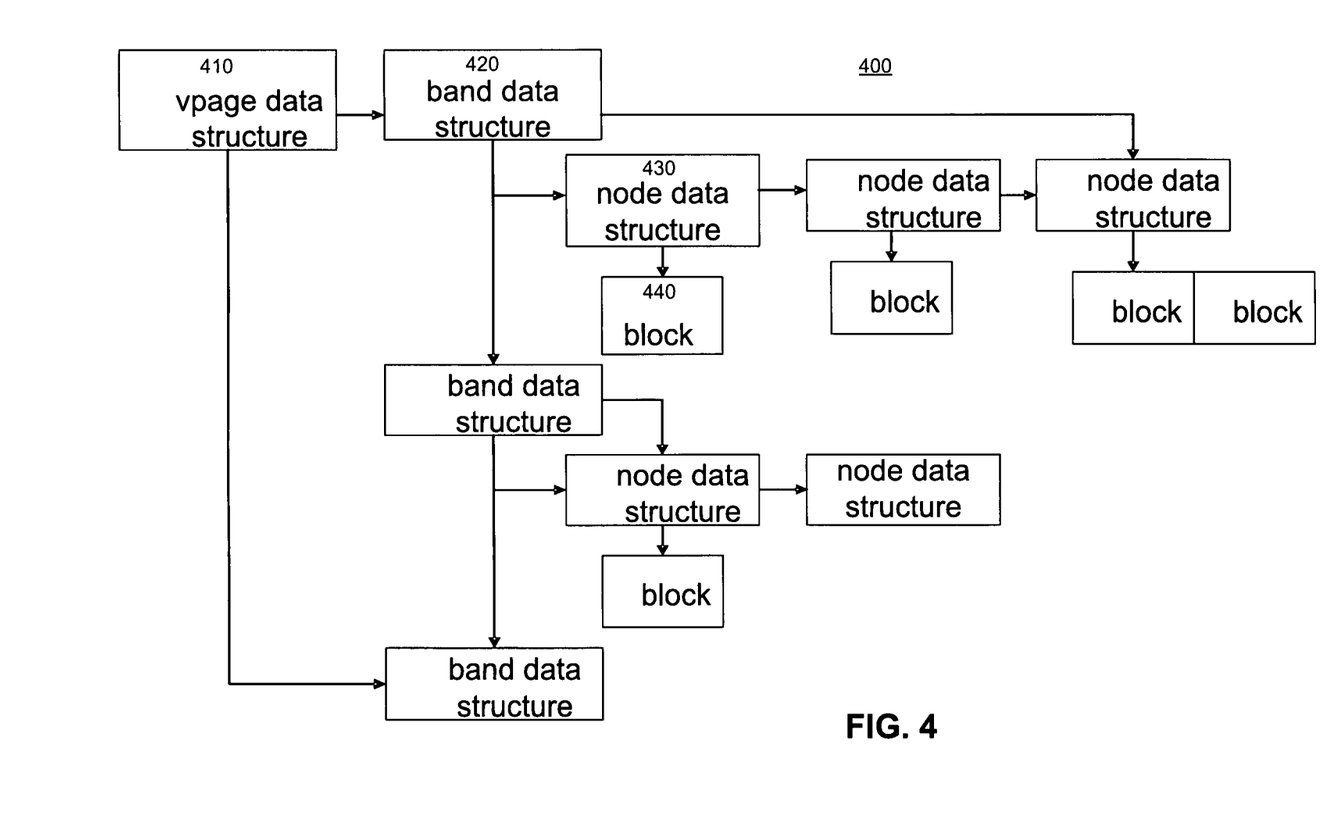
FIG. 4 shows an exemplary data structure for flexible display lists according to some embodiments of the present invention.

FIG. 4 shows an exemplary data structure 400 for flexible display lists, according to some embodiments of the present invention. In some embodiments, flexible display lists may take the form of RDLs. In some embodiments, flexible display lists, such as exemplary RDLs, may be stored in a data structure, such as exemplary data structure 400 that facilitates the dynamic manipulation and processing of data objects. In some embodiments, a physical page may comprise one or more virtual or logical pages. In some embodiments, a virtual or logical page may be represented by exemplary vpage data structure 410. Instantiated vpage data structures 410 are referred to as vpages. In some embodiments, exemplary vpage data 410 allows a logical model of a virtual page to be stored and manipulated in memory, such as exemplary memory 172. In some embodiments, vpage data structure 410 may include information specific to a virtual or logical page, including offsets to geometric bands, reference bands, and compression bands.

In some embodiments, a virtual page may further comprise one or more bands, which are also called geometric bands. In some embodiments, the bands may be horizontal bands or sections each holding objects present within that band of the logical page. Accordingly, vpage data structure 410 may include offsets to or reference a linked list comprising of instances of exemplary individual band data structures (also called geometric band data structures) 420. Instantiated band data structures 420 are referred to as bands (or geometric bands). In some embodiments, vpage data structure may further comprise a linked list of instances of exemplary individual band data structures 420. In some embodiments, each vpage data structure 410 may include information about any bands that it references. A band or geometric band relates to a geometrically defined region within the geometrical bounds of a virtual page. Typically this geometric region is rectangular in nature and may be as large as the vpage boundaries, or a sub region of the vpage. In some embodiments, the printable region of a vpage includes all geometric bands contained within that vpage.

The term band data is used to refer to object data within block 440 that is linked to a node data structure 430 that is further linked to band data structure 420. In some embodiments, individual band data structure 420 may contain data objects pertaining to that entire band. In some embodiments each band data structure may include offsets to or reference a linked list of instances of individual node data structures 430. Instantiated node data structures 430 are referred to as nodes. In some embodiments, each band data structure 420 may include information about any nodes that it references.

In some embodiments, individual node data structure 430 may include offsets to or reference any associated (zero or more) blocks of memory ("blocks") 440. In some embodiments, block 440 may be used to store intermediate graphical objects and other data generated from a PDL description. In some embodiments, language server 340 may generate intermediate graphical objects and other data objects from a PDL description for use by raster server 320. In some embodiments, each node data structure may include information about any blocks that it references. In some embodiments, blocks 440 may be a uniform, fixed size. In this specification, vpage data structure 410, band data structure 420, and node data structure 430 are also referred to as control data structures. In some embodiments, data stored in data structure 400 may also be accessed and edited.

In some embodiments, when a job is received by printer 170 language server 340 may invoke routines from RDL library 330 leading to the instantiations of vpage data structure 410 and an appropriate number of band data structures 420. In some embodiments, the system may maintain a list of free vpages, bands, and nodes in a vpage control data field, a band control data field, and a node control data field, respectively. In some embodiments, an instantiation of another vpage data structure 410 may occur for new virtual pages. In some embodiments, an instantiation of another band data structure may occur for new bands in a virtual page.

In some embodiments, objects generated by language server 340 may be used to build a vpage. A vpage may be rasterized by raster server 320. In some embodiments, a vpage may be rasterized band-by-band until all bands have been processed. In some embodiments, a band may be rasterized object-by-object until all objects have been provided to the rasterizer for that band. In some embodiments, the order in which bands may be rasterized may not be sequential. In some embodiments, multiple finished vpages may exist in the system at any given time. These may include vpages whose rasterization process has not completed. In some embodiments, vpages need not be rasterized in the order of their construction. After rasterization is complete, engine server 360 may invoke routines in RDL library to delete the vpage from memory, and release memory used by that vpage to memory pool 310.

Figure 5:
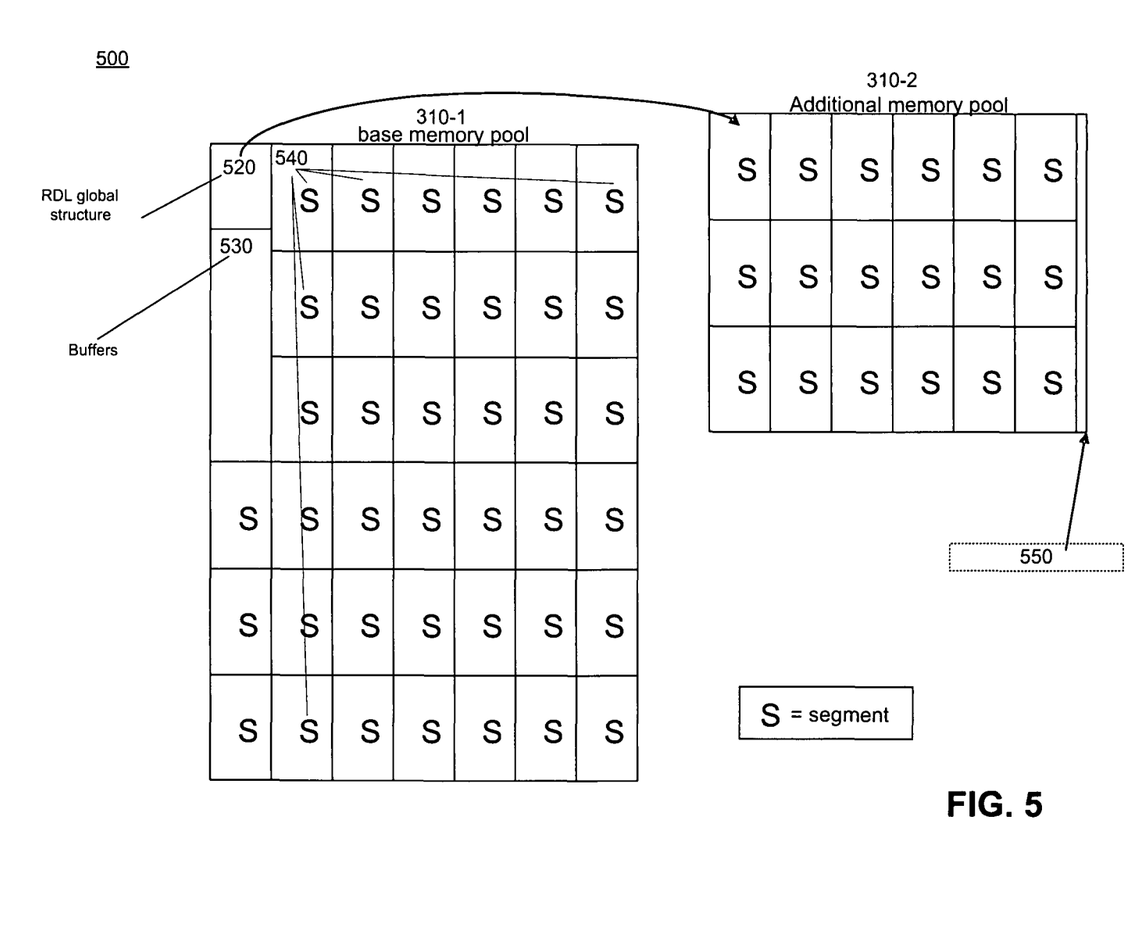
FIG. 5 shows the organization of exemplary memory pools according some embodiments of the present invention.

FIG. 5 shows an exemplary organization 500 of RDL memory pool 310 according some embodiments of the present invention. In some embodiments, RDL memory pool 310 may include one or more instances of data structure 400. In some embodiments, memory may be allocated at boot time to RDL memory pool 310. In some embodiments, RDL memory pool 310 may be allocated from memory 172. In some embodiments, the memory allocated at boot time may be a pre-determined amount of memory. Memory allocated to RDL memory pool 310 at boot time is termed the RDL base memory pool 310-1. In some embodiments, RDL memory pool may be allocated by the operating system, or by invoking routines RDL library 330. In some embodiments, additional memory 310-2 may be dynamically allocated and added to the base memory pool during system operation to increase the amount of memory available to RDL memory pool 310. Exemplary RDL memory pool 310 includes base memory pool 310-1 and additional memory pool 310-2. Memory may also be dynamically released from RDL memory pool 310 during system operation and made available for other uses. In some embodiments, routines invoked from RDL library 330 by language server 340, raster server 320, engine server 360, or other system components may use memory or access data structures specifically allocated to RDL memory pool 310.

At boot-time, one or more instances of global structure 520 may be allocated for use by RDL library 330 and other system components. In some embodiments, only a single instance of the global structure 520 may be allocated. In some embodiments, global structure 520 may include fields for management of RDL memory pool 310. For example, global structure 520 may include fields for offsets indicating the start of each memory pool; lists of blocks, nodes, bands, and vpages; offsets to various buffers, including compression, decompression, and compaction; and/or semaphores or other access co-ordination structures to synchronize access to RDL's memory by various system components.

In some embodiments, the starting address of RDL base memory pool 310-1 may be used to allocate an instance of global structure 520. In some embodiments, zero or more buffers 530 may also be allocated in RDL memory pool 310. In some embodiments, buffers 530 may be used for compression. Global structure 520 may include offsets to or reference buffers 530 as well as fields that contain information about buffers 530. In some embodiments, memory remaining in RDL memory pool 310 after allocation of RDL global structure 520 may be divided into a number of segments 540. In some embodiments, all segments 540 may be of a predetermined and/or fixed size. In some embodiments, the size of memory block 440 may correspond to the size of segment 540. Some memory 550 may remain after the allocation of segments.

In some embodiments, segment 540 may hold any control data structure such as vpage data structure 410, band data structure 420, or node data structure 430. In some embodiments, segment 540 may also hold block 440. In some embodiments, segments 540 are dynamically allocated using unallocated segments in RDL memory pool 310. In some embodiments, certain segments 540 may be used as a temporary working area at various points in time by routines in RDL library 330. For example, some segments 540 may be used as working area to rasterize data associated with one or more nodes. In some embodiments, the system may ensure the availability of adequate segments 540 for any working areas prior to allocating additional segments 540 from available unallocated memory in RDL memory pool 310.

Figure 6:
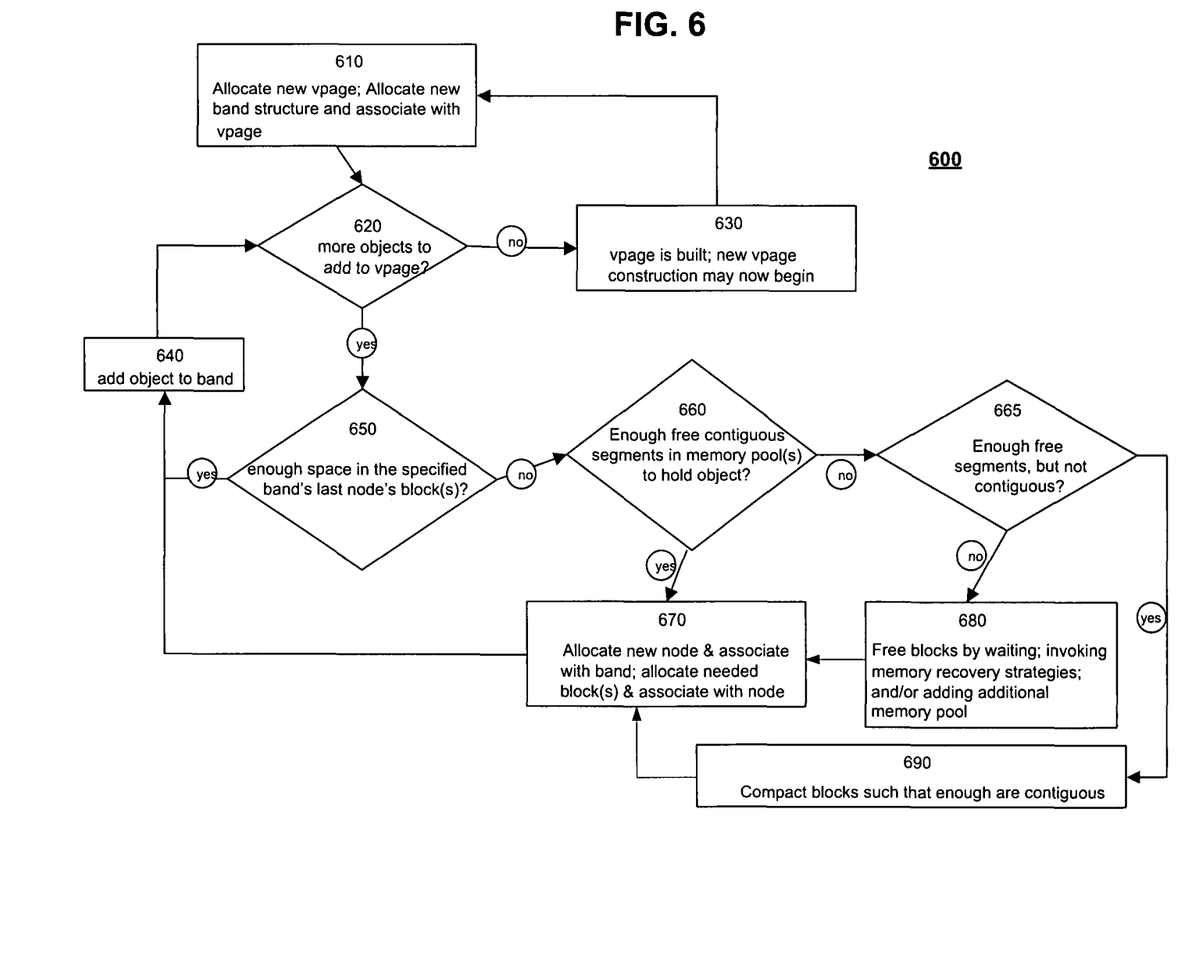
FIG. 6 shows a flowchart for an exemplary algorithm to build a virtual page.

FIG. 6 shows a flowchart for an exemplary algorithm 600 to build a virtual page. In step 610, a new vpage data structure 410 may be instantiated, and one or more new band data structures 420 may be associated with the vpage. In some embodiments, a list of free segments may be used to determine which blocks to allocate to vpages and bands. In step 620, algorithm 600 determines whether additional objects are being added to the vpage. If additional objects are being added to the vpage, then algorithm 600 determines if adequate space is available to add the object in step 650. In some embodiments, information pertaining to blocks 440 associated with the last instantiated node may be used to determine if adequate space is available to add the object. If space is available then the object may be added to the block 440 in step 640 and the algorithm returns to step 620.

If the space available is inadequate, then in step 660, the algorithm determines if there are sufficient contiguous segments 540 available to hold the object. If there are enough contiguous segments 540, then, in step 670, needed segments 540 can be allocated, a new node may be instantiated and associated with the current band, and needed blocks 440 may then be associated with the node. Next, in step 640, the object is added to newly allocated blocks 440 and the algorithm returns to step 620.

In step 665, if there is enough memory available to hold the object, but an inadequate number of contiguous segments 540, then, in step 690, compaction may be used to create an adequate number of contiguous segments 540. In step 670, needed segments 540 may then be allocated, a new node may be instantiated and associated with the current band, and needed blocks 440 may then be associated with the node. Next, in step 640, the object is added to newly allocated blocks 440 and the algorithm returns to step 620.

In step 665, if not enough memory is available to hold the object, then, in step 680 blocks may be freed by waiting, and/or requesting additional memory pool 310-2, and/or using one or more memory recovery schemes. In step 670, needed segments 540 may then be allocated, a new node may be instantiated and associated with the current band, and needed blocks 440 may then be associated with the node. Next, in step 640, the new data object is added to newly allocated blocks 440 and the algorithm returns to step 620.

In step 620, if there are no additional objects to be added, then, in step 630, the vpage has been built. The algorithm returns to step 610, where it may commence the building of new vpage.

In some embodiments, language server 340 may generate some of the graphical or other data objects, and invoke routines in RDL library 330 to place the generated objects in an RDL. In some embodiments, routines invoked in RDL library 330 may instantiate a node data structure 430 and associate the node with an appropriate band. Invoked routines may also allocate one or more blocks 440 and associate the allocated blocks 440 with the new node. The graphical or data object generated by language server 340 may then be copied into one or more of the blocks 440 associated with the node. In some embodiments, additional graphical or data objects that may be generated by language server 340 may also be copied into appropriate available associated blocks 440. In some embodiments, if blocks 440 associated with a node are full, then a new node may be allocated, associated with the appropriate band, and blocks 440 available in memory pool 310 may be associated to the new node. The object may then be copied into one or more new blocks 440.

In some embodiments, language server 340 may determine the available space in blocks 440 associated with a node and generate data or graphical objects that fit into the available space. In some embodiments, a large object may be broken up into two or more smaller objects to allow one of the smaller objects to be placed in the unused space available in a block 440 associated with a node. In some embodiments, large objects that do not fit into a single block 440 may be placed in multiple contiguous blocks 440 associated with a node. In some embodiments, unused blocks 440 may be rearranged and joined in memory to create a single larger contiguous block associated with a specific node.

In some embodiments, band data structure 420, which contains information about a band related to a vpage, may include region independent data. For example, band data may include objects that may have geometric boundaries that extend beyond the bounds of a particular geometric band. In some instances, band data may include objects that are used multiple times. In some embodiments, when data or graphical objects generated by language server 340 span geometric band boundaries the objects may be stored in a separate reference band and an offset to the location of the object in the reference band is stored at an appropriate location in that specific geometric band. In some embodiments, objects that are repeatedly used in a virtual page, or a document, may also be stored in a reference band. The use of reference bands to store repeatedly used objects optimizes memory utilization and allows a repeatedly used object to be placed in a reference band once, but used multiple times across bands.

In some embodiments, if all available blocks 440 have been allocated, routines in RDL library may be invoked to free some allocated memory blocks 440. In some embodiments, an algorithm to free allocated memory blocks may be terminated if an adequate number of blocks are made available. In some embodiments, the system may simply wait for vpages to be deleted and for memory to be freed. In some embodiments, the system may cycle through all vpages and free blocks 440 that are in both memory pool 310 and in an alternate storage location. For example, blocks 440 that have been written to secondary storage 173 may be freed.

In some embodiments, the system may also execute one or more memory recover strategies. Memory recover strategies may include compression of data blocks. In some embodiments, data blocks may be compressed using zlib, gzip, or a host of other well-known lossless data compression algorithms. In some embodiments, buffers 530 may be used as working areas during compression. In some embodiments, for each band in a vpage, all data blocks may be compressed and the compressed data may be placed in a compression band that is associated with the vpage. In some embodiments, node data structure 430 may be referenced by geometric bands, reference bands, compression bands, or any other band-like structure. Compression bands may contain associated node linked block data in a compressed state. In some embodiments, blocks 440 freed as a result of the compression may be returned to memory pool 310 for subsequent allocation. In some embodiments, after blocks 440 associated with a node have been compressed, a field in the node is updated to indicate the location of compressed data in the compression band. In some embodiments, a node's compressed data may be deleted when the entire vpage has been processed.

In some embodiments, images in the data blocks of a vpage may be compressed. In some embodiments, the images may be compressed in-place. In some embodiments, buffers 530 may be used as working areas during compression. Compressed images occupy less space consequently objects in the band following the image may be copied into areas freed by image compression. In some embodiments, image compression followed by the copying of subsequent objects into areas freed by image compression may result in the freeing of blocks 440, which are then returned to memory pool 310 for allocation. In some embodiments, image compression may be accomplished by using well-known image compression algorithms such as JPEG. In some embodiments, if images in a vpage are compressed, all future images may also be compressed before being put into a display list to maintain uniform image quality and prevent differences between different images. In some embodiments, a compression factor such as the Q factor in JPEG may be specified and/or varied. In some embodiments, at rasterization time, each image may be decompressed. In some embodiments, lossless image compression techniques may be utilized.

In some embodiments, all blocks 440 associated with nodes in a vpage may be stored in secondary storage 173. In some embodiments, storage on computing device 110 or server 130 may be used. In some embodiments, a file system, DMA storage, compressed memory, USB flash drives, memory sticks, hard disks, or some other type of memory may be used. In some embodiments, all blocks 440 associated with a node may be written to a file system in a serial manner. After blocks 440 have been stored, they may be deleted and any freed memory returned to memory pool 310. During rasterization stored blocks 440 may be copied back to memory pool 310. In some embodiments, copies of stored blocks 440 in secondary storage 173 may be deleted when the vpage is no longer needed.

In some embodiments, product-specific functions may also be implemented to increase memory available to RDL memory pool 310. For example, printer 170 may be able to request that additional memory, such as exemplary memory 310-2, be added to RDL memory pool 310 using memory currently outside RDL memory pool 310. In some embodiments, a vpage being built by language server 340 may be pre-rasterized. "Pre-rasterization" is a process by which the graphical objects in blocks 440 in a vpage are rasterized and stored in frame buffer 350. Blocks 440 that have been pre-rasterized may then be freed. In some embodiments, after completion of a pre-rasterization cycle, additional (non pre-rasterized) blocks 440 in the partially-rasterized vpage may continue to be built. In some embodiments, multiple pre-rasterization cycles may be applied to a vpage during construction of that vpage.

In some embodiments, a program for conducting the above process can be recorded on computer-readable media 150 or computer-readable memory. These include, but are not limited to, Read Only Memory (ROM), Programmable Read Only Memory (PROM), Flash Memory, Non-Volatile Random Access Memory (NVRAM), or digital memory cards such as secure digital (SD) memory cards, Compact Flash™, Smart Media™, Memory Stick™, and the like. In some embodiments, one or more types of computer-readable media may be coupled to printer 170. In certain embodiments, portions of a program to implement the systems, methods, and structures disclosed may be delivered over network 140.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A non-transitory computer-readable memory comprising a data structure for storing an intermediate printable data generated from a first printable data, the data structure comprising:
    at least one memory pool comprising a plurality of uniformly-sized segments to store the intermediate printable data;
    at least one global structure for storing information related to the at least one memory pool; and
    buffers for storing buffer data that results from performing operations on the first printable data and the intermediate printable data, wherein a first subset of the plurality of uniformly-sized segments are for storing a plurality of control data structures comprising a linked list of vpage data structures representing virtual pages in a document.

2. The computer-readable memory of claim 1, wherein the uniformly-sized segments occupy contiguous memory locations.

3. The computer-readable memory of claim 1, wherein the uniformly-sized segments have a predetermined size.

4. The computer-readable memory of claim 1, wherein a second subset of the plurality of uniformly-sized segments are for storing objects present in the intermediate printable data.

5. The computer-readable memory of claim 4, wherein objects present in the intermediate printable data comprise one or more of virtual pages, bands, and nodes.

6. The computer-readable memory of claim 1, wherein a vpage data structure comprises a linked list of geometric band data structures representing bands associated with the corresponding virtual page.

7. The computer-readable memory of claim 6, wherein the data managed by the geometric band contains offsets to objects stored in a reference band.

8. The computer-readable memory of claim 7, wherein the reference band is configured to hold data or graphical objects.

9. The computer-readable memory of claim 8, wherein the data or graphical objects span geometric band boundaries.

10. The computer-readable memory of claim 8, wherein the data or graphical objects are repeatedly used.

11. The computer-readable memory of claim 6, wherein the vpage data structure includes offsets to a compression band.

12. The computer-readable memory of claim 11, wherein the compression band is configured to hold compressed data or compressed graphical objects.

13. The computer-readable memory of claim 6, wherein a geometric band data structure comprises a linked list of node data structures, wherein a node data structure includes offsets to associated blocks.

14. The computer-readable memory of claim 13, wherein objects in the blocks associated with the node data structures are individually accessed, edited, and processed.

15. The computer-readable memory in claim 14, wherein the processing performed on the objects in the blocks associated with the node data structures includes compression, decompression, and pre-rasterization.

16. The computer-readable memory of claim 15, wherein each block holds one or more of a data object, a graphical object, and offsets to data or graphical objects.

17. The computer-readable memory of claim 15, wherein each block is uniformly-sized, and equal in size to the uniformly-sized segment.

18. The computer-readable memory of claim 1, wherein the global structure pertaining to the memory pool includes fields for one or more of:
    offsets to the start of the at least one memory pool;
    mechanisms to regulate access to the at least one memory pool;
    offsets to the start of the buffers; and
    lists of vpages, bands, nodes, and blocks.

19. The computer-readable memory of claim 1, wherein the buffers include one or more of compression buffers, decompression buffers, and compaction buffers.

20. The computer-readable memory of claim 1, wherein the memory pool includes a base memory pool allocated at boot time and additional dynamically allocated memory pools.

21. The computer-readable memory of claim 1, wherein the first printable data is a PDL description of the document and the intermediate printable data is a display list representation.

22. A non-transitory computer-readable medium that stores instructions, which when executed by a processor create, access, or modify a data structure for storing an intermediate printable data generated from a first printable data comprising:
    at least one memory pool comprising a plurality of uniformly sized segments to store the intermediate printable data;
    at least one global structure for storing information related to the at least one memory pool; and
    buffers for storing buffer data which result from performing operations on the first printable data and the intermediate printable data, wherein a subset of the plurality of uniformly-sized segments are for storing a plurality of control data structures comprising a linked list of vpage data structures representing virtual pages in a document.

23. A non-transitory computer readable memory containing instructions for controlling a processor to create, access, or modify a data structure for storing an intermediate printable data generated from a first printable data comprising:
    at least one memory pool comprising a plurality of uniformly sized segments to store the intermediate printable data;
    at least one global structure for storing information related to the at least one memory pool; and buffers for storing buffer data which result from performing operations on the first printable data and the intermediate printable data, wherein a subset of the plurality of uniformly-sized segments are for storing a plurality of control data structures comprising a linked list of vpage data structures representing virtual pages in a document.

* * * * *